United States Patent [19]

Thonn

[11] Patent Number: 5,048,031
[45] Date of Patent: Sep. 10, 1991

[54] LASER WITH ACTIVELY STABILIZED ETALON FOR SINGLE FREQUENCY OPERATION

[75] Inventor: Tracy F. Thonn, Sunnyvale, Calif.

[73] Assignee: Coherent, Inc., Palo Alto, Calif.

[21] Appl. No.: 512,846

[22] Filed: Apr. 23, 1990

[51] Int. Cl.$^5$ .............................................. H01S 3/106
[52] U.S. Cl. ........................................ 372/33; 372/20; 372/19
[58] Field of Search .................... 372/29, 31, 32, 33, 372/34, 20, 19, 102

[56] References Cited

U.S. PATENT DOCUMENTS

| | | | |
|---|---|---|---|
| 3,967,211 | 6/1976 | Itzkan et al. | 372/32 |
| 3,987,373 | 10/1976 | Mohler | 372/29 |
| 4,081,760 | 3/1978 | Berg | 331/94.5 C |
| 4,097,818 | 6/1978 | Manoukian et al. | 331/94.5 C |
| 4,782,492 | 11/1988 | McMahon et al. | 372/32 |
| 4,914,662 | 4/1990 | Nakatani et al. | 372/29 |

OTHER PUBLICATIONS

Coherent Radiation Technical Bulletin, No. 106, dated 1971.
Coherent brochure on Single Frequency Operation.
"Tunable Dye Lasers", T. F. Johnston, Jr., Encyclopedia of Physical Science and Technology, vol. 14, 1987.

Primary Examiner—Frank Gonzalez
Assistant Examiner—Susan S. Morse
Attorney, Agent, or Firm—Limbach, Limbach & Sutton

[57] ABSTRACT

An actively stabilized laser is disclosed which includes a temperature tunable etalon in the laser cavity for single frequency operation. The operation of the laser is actively monitored to detect variations induced by changes in the length of the resonator. These changes tend to cause the frequency of the selected longitudinal mode to shift so that it is no longer aligned with the peak of the transmission curve of the etalon. When this misalignment occurs, operation deteriorates. By monitoring laser performance, the misalignment can be detected and the temperature of the etalon can be changed to realign its transmission peak to the selected mode. In the preferred embodiments, either the laser output power or the current supplied to the laser is monitored. This approach substantially reduces mode hopping.

16 Claims, 6 Drawing Sheets

CHANGE ETALON
TEMPERATURE
SUBROUTINE

LASER WITH ACTIVELY STABILIZED ETALON FOR SINGLE FREQUENCY OPERATION

TECHNICAL FIELD

The subject invention relates to lasers using a temperature tunable etalon for single frequency operation. An active stabilization approach is disclosed to prevent mode hopping.

BACKGROUND

There are number of scientific and commercial applications for stable, single frequency laser output. An analysis of the energy levels of laser transitions would indicate that laser output would occur at discrete, well spaced intervals such that single frequency operation should be easy to achieve. However, in practice, a laser generates light over rather broad bandwidths referred to as the laser gain curve. This broadening occurs for a number of reasons. For example, in an ion laser, significant Doppler broadening occurs because the laser is operated at a very high plasma temperature. In addition, the magnetic fields used in an ion laser to contain the discharge creates Zeeman splitting which also broadens the line width. It is not uncommon to have a line width on the order of 10 GHz.

Since the laser cavity is a type of Fabry-Perot interferometer, the energy output over the gain curve is not continuous but occurs at discrete, closely space frequencies. The output frequencies are based upon the number of discrete longitudinal modes that are supported by the laser cavity. The longitudinal modes will occur at wavelengths such that an integral number of half wavelengths equals the length between the mirrors of the resonator. The calculated separation in frequency between these modes is quite small, on the order of 150 MHz.

Laser oscillation can occur only at frequencies where the gain curve exceeds the losses in the optical path of the resonator. In practice, the broadened laser gain curve exceeds the cavity losses over a large frequency range, on the order of 8 to 10 GHz. As noted above, there will be a number of discrete, closely spaced modes oscillating within this range.

Various approaches have been used in the prior art to limit the oscillation of a laser to one of the competing longitudinal modes. One of the most common methods requires the use of a frequency selective etalon.

There are number of types of etalons. In its simplest form, an etalon consists of a quartz glass plate with parallel surfaces that is placed in the laser resonator at a non-normal angle. Internal reflections give rise to interference effects which cause the etalon to behave as a frequency selective transmission filter, passing with minimum loss frequencies close to a transmission peak and rejecting by destructive interference other frequencies. In practice, the transmission peak of the etalon is set to coincide with a particular longitudinal mode resulting in single frequency operation of the laser.

The transmission peak of the latter type of etalon can be tuned by adjusting the angle of the etalon in the cavity or by varying the temperature. Tuning by adjustment of angle is somewhat limited since this approach tends to increase power losses. Therefore, the etalon is typically set at the minimum angle which will produce frequency selection while still maximizing power. The peak of the transmission curve of the etalon is adjusted by varying its temperature. In practice, the etalon is tuned so that its transmission peak is in alignment with a particular longitudinal mode and then held at a fixed temperature during operation.

Other types of more sophisticated etalons are available. One such type is described in U.S. Pat. Nos. 4,081,760 and 4,097,818, both assigned to the assignee of the subject invention and incorporated herein by reference. The etalons described in the these references consist of a pair of prisms having an air gap therebetween. A PZT crystal is attached to one of the prisms. When a drive voltage is applied to the PZT, the width of the air gap between the prisms is varied such that the transmission peak of the etalon is changed. As can be appreciated, the latter type of etalon is more expensive and more complex to operate than a solid etalon.

As noted above, the particular modes oscillating in a laser are directly related to the length of the resonator. Thus, as the length of the resonator drifts, the frequency of any given mode (and hence the frequency of the output of the laser) will also drift. As the frequency of the selected mode drifts, it will move out of alignment with the peak of the transmission curve of the etalon. As this occurs, the power output of the laser will drop as the mode drifts to lower and lower etalon transmission levels. If the length of the resonator continues to change, there will come a point where the next adjacent longitudinal mode will be transmitted by the etalon to a greater extent than the initially selected mode and the output of the laser will abruptly shift to the new frequency of the adjacent mode. This phenomena is called mode hopping. In practice, the laser power will often drop on the order of twenty percent between each mode hop.

There are many applications which can not tolerate mode hopping. The most sensitive application is in holography where exposures of photographic materials can take several minutes. Most holographic systems can tolerate some drift as the resonator length changes, but abrupt mode hopping can ruin processing.

The most straightforward method of minimizing mode hopping found in the prior art is to create a highly stabilized resonator where length changes are minimized. Length changes as small as 0.25 microns can cause a mode hop. Stability can be maximized if the laser optics are mounted to a SuperInvar rod that has a very low coefficient of thermal expansion.

The latter approach is useful if environmental factors can be kept relatively constant. For example, it is recommended that the temperature of the ambient air and water used to cool the laser be controlled. Unfortunately, these latter requirements are hard to meet. For example, in a typical 24 hour period, the ambient air temperature may rise and fall by four degrees C. Even with a SuperInvar support rod (expansion coefficient about $0.5 \times 10^{-6}/°C.$), a temperature change of 0.5 degrees will cause a frequency shift of approximately 150 MHz and produce a mode hop. Thus, if the laser is run for 24 hours in a typical environment, 16 mode hops would occur.

Another approach for minimizing mode hopping is to actively stabilize the length of the resonator. In the latter approach, the position of the resonator mirrors are varied to maintain a selected resonator length even though the mounting structures are expanding or contracting due to temperature variations. Unfortunately, this approach is both complex and expensive.

Active stabilization systems are also found in tunable dye lasers. In a tunable dye laser, a plurality of components are used to scan the output of the laser over a large frequency range. These components typically include a birefringent filter, a tipping Brewster plate and one or more etalons. In such a laser system, a very fast and accurate method is needed to control the etalon so that the peak of the transmission curve follows the scanned frequency.

One type of active stabilization system is found in the Model 699 dye laser manufactured by Coherent, Inc. In this laser, an air gap etalon of the type described in the above cited patents is used. The transmission of the etalon can be rapidly adjusted by driving a PZT attached to one of the prisms. In order to more accurately control the system, the PZT drive voltage is dithered at a few KHz to induce a small amplitude modulation in the output of the laser beam. This amplitude modulation is phase-sensitively detected giving a discriminate signal permitting the peak of the transmission curve of the etalon to be locked to the cavity mode frequency. (See description in "Tunable Dye Lasers", T. F. Johnston, Jr., page 123, Encyclopedia of Physical Science and Technology, Vol. 14, Academic Press, 1987) While the latter approach is highly accurate, it is also complex and expensive.

Therefore it is an object of the subject invention to provide an improved system where the performance degradation associated with changes in the length of the resonator are addressed in a simple and inexpensive manner.

It is another object of the subject invention to provide a single frequency laser adapted for use with a passively stabilized laser resonator length.

It is a further object of the subject invention to provide a laser system where the etalon is actively stabilized without using an expensive air gap etalon or the associated dither and track circuitry.

It is another object of the subject invention to provide a laser system wherein the temperature of the etalon is actively controlled.

It is still a further object of the subject invention to provide a laser system wherein the variations in power are monitored in order to actively adjust the temperature of an etalon to prevent mode hopping.

It is still another object of the subject invention to provide a laser system with an output power stabilization loop wherein the variations in current are monitored in order to actively adjust the temperature of an etalon to prevent mode hopping.

SUMMARY OF THE INVENTION

In accordance with these and many other objects, the subject invention provides for a laser system configured for stable, single frequency operation. The laser system is the type which utilizes an etalon, located within the resonator, for selecting a particular output frequency. A means is provided for adjusting the peak of the transmission curve of the etalon. In the preferred embodiment, the transmission curve is adjusted by varying the temperature of the etalon. Accordingly, the etalon is located in an oven whose temperature can be controlled by commands from a processor.

As noted above, in the prior art systems which use a solid etalon, the temperature of the etalon is adjusted and fixed to maximize transmission and output power from a selected longitudinal mode. However, the latter approach did not compensate for changes in the length of the resonator during operation.

In contrast, and in accordance with the subject invention, the temperature of the etalon is actively adjusted by the processor during operation to prevent mode hopping. In order to properly adjust the temperature, at least one output parameter of the laser must be measured that would be indicative of the changes in the resonator length. Since the change in the resonator length will cause the output frequency to drift, a means could be provided to monitor frequency. This information could be used to adjust the etalon temperature. One drawback to this approach is that it would require an extra detection mechanism and would therefore be more costly. Another drawback to this approach is that it would be difficult to maximize performance.

Accordingly, in the preferred embodiment of the subject invention, an output parameter is monitored that is indicative of the variations in the alignment of the peak of the transmission curve of the etalon and the selected longitudinal mode of the laser. In one embodiment of the subject invention, changes in output power are measured to give an indication of the amount of drift between the frequency of the selected longitudinal mode and the peak of the transmission curve of the etalon. In an alternate embodiment, changes in the current supplied to the laser are monitored. The latter approach is used if the laser system has been constrained to operate at a fixed power by adjusting the current supplied thereto.

In either case, the parameter measured gives a direct indication of the performance of the laser so that performance can be maximized while the single frequency output can be stabilized. Advantageously, both laser power and current are typically monitored for other reasons so that no additional hardware is necessary.

Further objects and advantages will become apparent from the following detailed description taken in conjunction with the drawings in which:

DETAILED DESCRIPTION OF THE PREFERRED EMBODIMENTS

Figure 1:
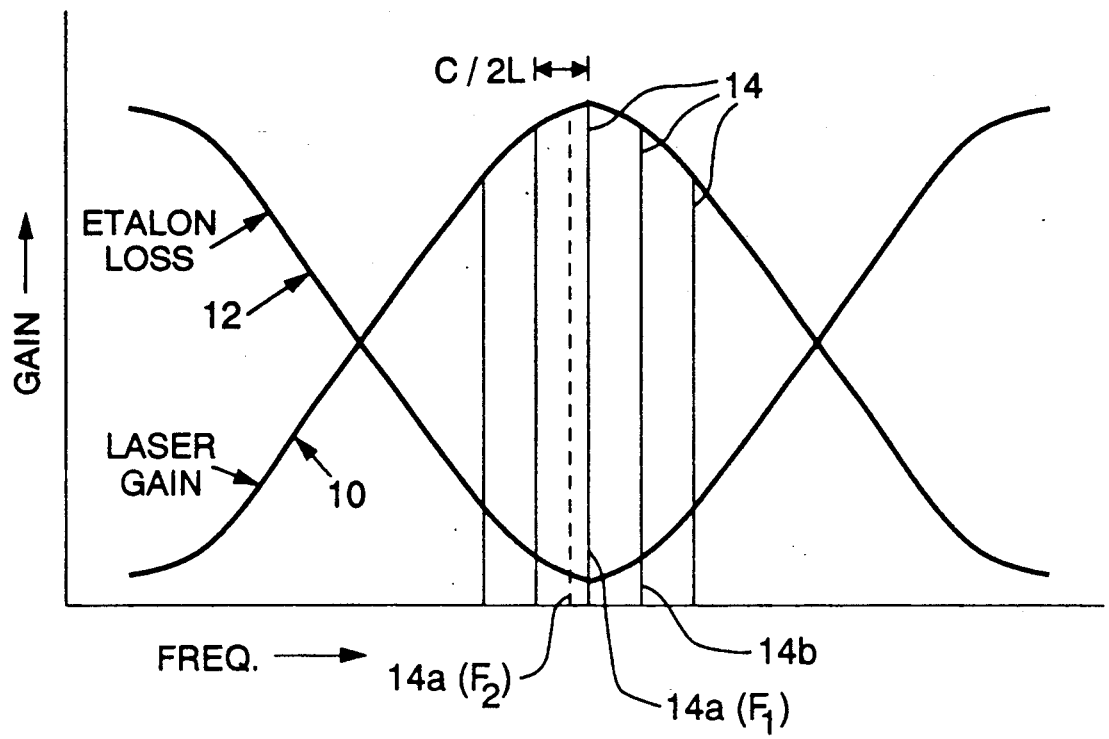
FIG. 1 is a graph illustrating the relationship between laser gain and the loss introduced by an etalon.

Turning first to FIG. 1, there is illustrated a graph which demonstrates the interaction between the gain curve 10 in a laser with the transmission losses (curve 12) created by an etalon introduced into the laser resonator. As noted above, the gain curve for a particular laser transition tends to be relatively broad due to a number of factors. Within that broad bandwidth, there will be a number of discrete, closely spaced longitudinal modes 14. The spacing between the modes is based on the length L of the resonator and is given by C/2L, where C is the speed of light. In the laser shown in FIG. 2, this separation is on the order of 129 MHz. In the graph of FIG. 1, the minimum of the loss (or the peak of the transmission) of the etalon is shown aligned with one of the longitudinal modes, 14a. This alignment is typically fixed by the laser operator so that a single frequency, $F_1$, is selected.

As can be seen, the differences in the loss added by the etalon between adjacent longitudinal modes is not great. However, in practice, even slight differences in loss will cause adjacent modes to become extinguished due to mode competition so that the laser will oscillate only at the selected mode.

During operation of the laser, ambient conditions will cause the length of the resonator to change. Since each longitudinal mode is tied to the length of the resonator, the modes will also drift. Longitudinal mode 14a, shown in phantom line, indicates such a drift. It should be noted that the frequency of this mode has also changed, from $F_1$ to $F_2$.

This drift phenomena creates a number of problems. First, as can be seen, the shifted frequency $F_2$ is no longer aligned with the peak of the transmission curve of the etalon. This misalignment will result in a drop in power of the output of the laser since the transmission of the etalon is lower away from the peak. Clearly, it would be desirable to maintain the alignment between the selected mode and the peak of the transmission curve of the etalon during operation.

A more serious problem occurs as the length of the resonator continues to drift. More specifically, at some point, the next adjacent longitudinal mode 14b will drift to a point closer to the peak of the transmission curve of the etalon than mode 14a. At this point, the losses in the laser will favor longitudinal mode 14b and the output will jump abruptly from mode 14a to mode 14b. In the illustrated laser this corresponds to a mode hop of 129 MHz. In accordance with the subject invention, this effect is controlled by adjusting the position of the peak of the etalon transmission curve to follow the frequency drift of the selected longitudinal mode 14a.

Figure 2:
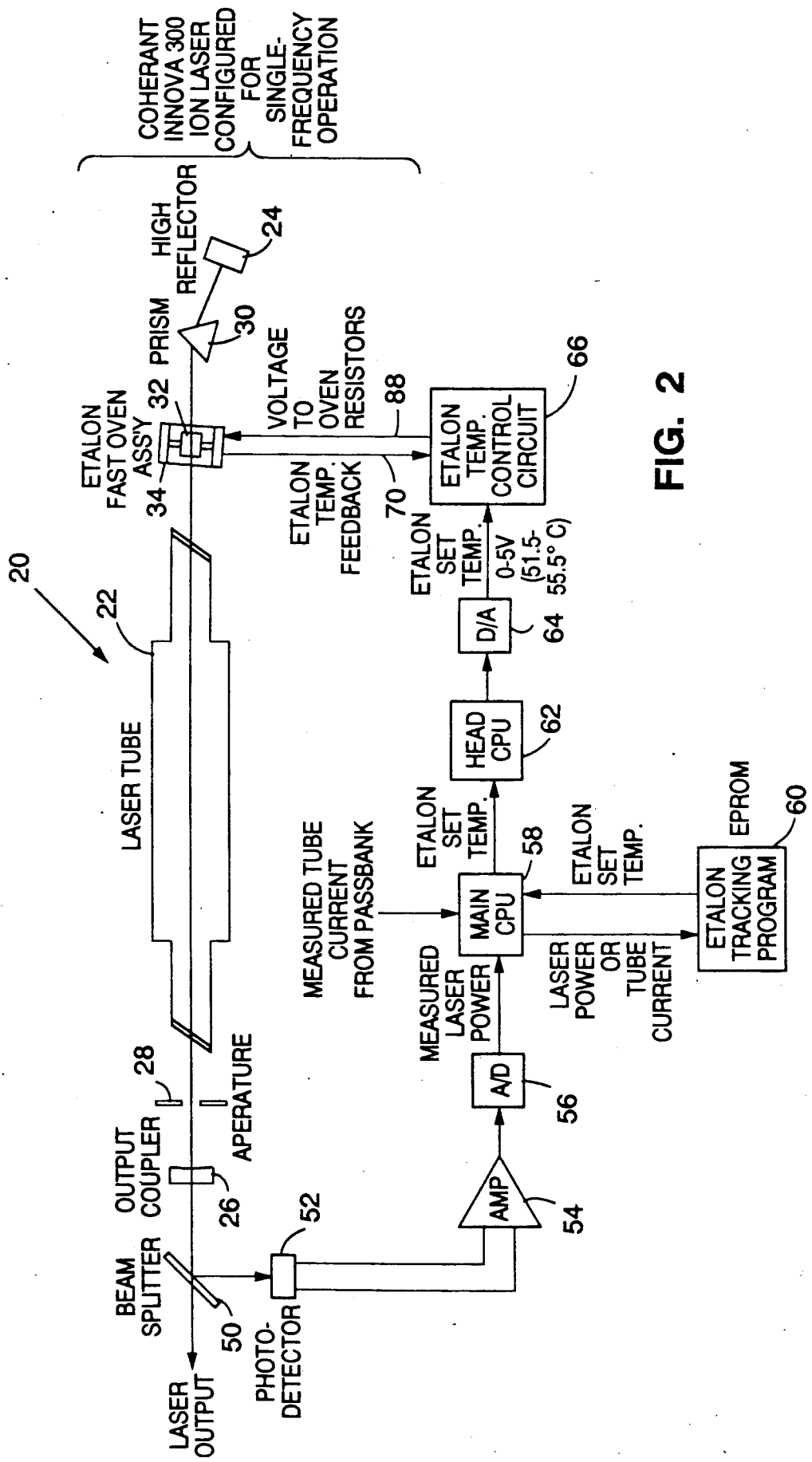
FIG. 2 is a schematic diagram of a single frequency laser system employing an etalon and operating with the method of the subject invention.

Turning now to FIG. 2, there is illustrated a schematic diagram of a stabilized, single frequency laser system. The laser system 20 shown herein is a modification of the INNOVA 300 ion laser manufactured by Coherent, Inc. It should be understood however, that the subject invention can be employed in any system which utilizes a temperature adjustable etalon for frequency selection.

Laser 20 includes a plasma tube 22 for containing the gas discharge. Plasma tube 22 is formed in accordance with the disclosure in U.S. Pat. No. 4,378,600, issued Mar. 29, 1983. The plasma tube 22 sits within a resonator defined by high reflecting end mirror 24 and a partially transmissive output coupler 26. An aperture 28 is provided to control the transverse mode output of the laser. The resonator components are mounted on a SuperInvar rod to passively stabilize the resonator to the maximum extent.

A prism 30 is also placed in the cavity. Prism 30 is used for gross wavelength selection and isolates particular broadband transitions. The tilt angle of the prism is adjusted for wavelength selection.

An etalon 32 is also located in the cavity to select a single frequency (ie. longitudinal mode) from the multiple adjacent modes 14 shown in FIG. 1. In the preferred embodiment of the subject invention, etalon 32 is a plate of fused silica with highly parallel surfaces. This type of etalon is available from Coherent Components Division under part No. 0502-908-XX. This etalon comes in one version that is uncoated and is suitable for ultraviolet and low-gain visible wavelengths. Another version is available with a twenty percent reflective coating and is designed for use with high-gain visible wavelengths. The latter type of etalon is preferred since it is low in cost and can be controlled in a relatively simple manner.

As noted above, the peak of the transmission curve of the etalon can be adjusted by tilting the etalon. However, as the tilt angle increases, walk-off losses increase and power drops. Therefore, in the preferred embodiment, the etalon 32 is installed at the factory with a tilt angle of about two mrad, which is just enough for wavelength selection and yet minimizes losses.

In the preferred embodiment, the peak of the transmission curve of the etalon is controlled by adjusting the temperature of the etalon. As the etalon temperature is adjusted, the index of refraction of the material is varied, changing the effective path lengths within the material and thereby changing the interference effects. In the etalons referred to above, a 1° C. change in temperature will tune the peak of the transmission curve by about 5 GHz at 514.5 nm wavelength.

In order for the stabilization system of the subject invention to operate effectively, a means must be provided to accurately control the temperature of the etalon. In the preferred embodiment, this means includes an oven 34, into which the etalon 32 is mounted.

Figure 3:
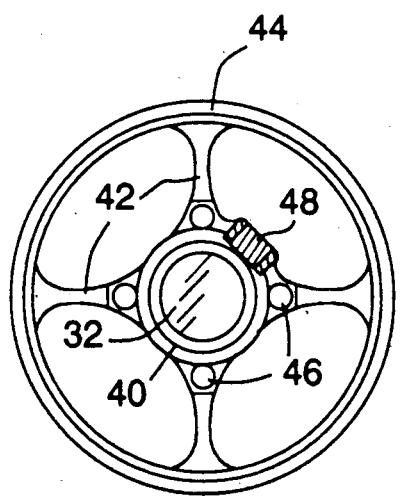
FIG. 3 is an end view, partially in section of the oven in which the etalon is mounted.
Figure 4:
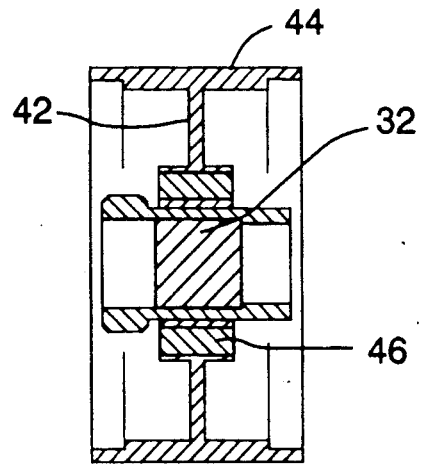
FIG. 4, is a cross sectional view of the oven shown in FIG. 3.

FIGS. 3 and 4 illustrate a suitable oven design. This design includes a central cylindrical sleeve 40 for receiving the etalon 32. Four arms 42 extend radially outward from the sleeve 40. Outer cylinder 44 supports the arms. This design has a relatively low thermal mass and a relatively high thermal conductivity. By this arrangement, the oven can react quickly to commands to vary the temperature of the etalon. The oven can be accurately adjusted and stabilized to within 0.004° C.

The etalon is heated by four resistive elements 46 mounted in bores formed in sleeve 40. A temperature transducer 48 is also mounted in sleeve 40 to monitor the temperature of the etalon. The resistors and transducer are wired to the etalon control circuit discussed below with reference to FIG. 5. The oven 34 is mounted in a separate fixture (not shown) to provide the etalon tilt angle discussed above.

The etalon and oven package described above is presently being used by Coherent in its existing single frequency ion laser systems. However, as noted above, in the existing systems, the etalon temperature was optimized and then fixed during operation. In the present invention, the temperature is continuously adjusted to compensate for changes in the length of the resonator.

The feedback control loop of the subject invention is illustrated in FIG. 2. More specifically, in the first embodiment of the subject invention, a portion of the laser light emitted from the laser is picked off by a beam splitter 50 and directed to a photodetector 52. The photodetector generates a current which is proportional to the output power of the laser. As noted above, this power will drop as the frequency of the selected longitudinal mode drifts away from the peak in the transmission curve of the etalon.

The output from the photodetector 52 is amplified by amplifier 54 and then converted to a digital signal by A/D converter 56. This digital value is supplied to the main processor 58 handling all the operating parameters of the laser. The measured power value is supplied to an internal etalon tracking program 60 discussed below with reference to FIG. 6. In the preferred embodiment, the tracking program will be stored in an EPROM connected to the main processor. The output of the tracking program will be an instruction to set the etalon at a given temperature to maximize performance.

In the commercial embodiment, the laser head (ie. plasma tube and resonator components) has some functions controlled by a separate processor 62. The etalon temperature setting instruction will be sent through the latter processor and then converted to an analog voltage signal by a D/A converter 64.

The output from converter 64 will be a voltage from 0 to 5 volts. This spread will cover a temperature range of four degrees in the etalon, between 51.5° and 55.5° C. This voltage is supplied to the etalon temperature control circuit 66.

Figure 5:
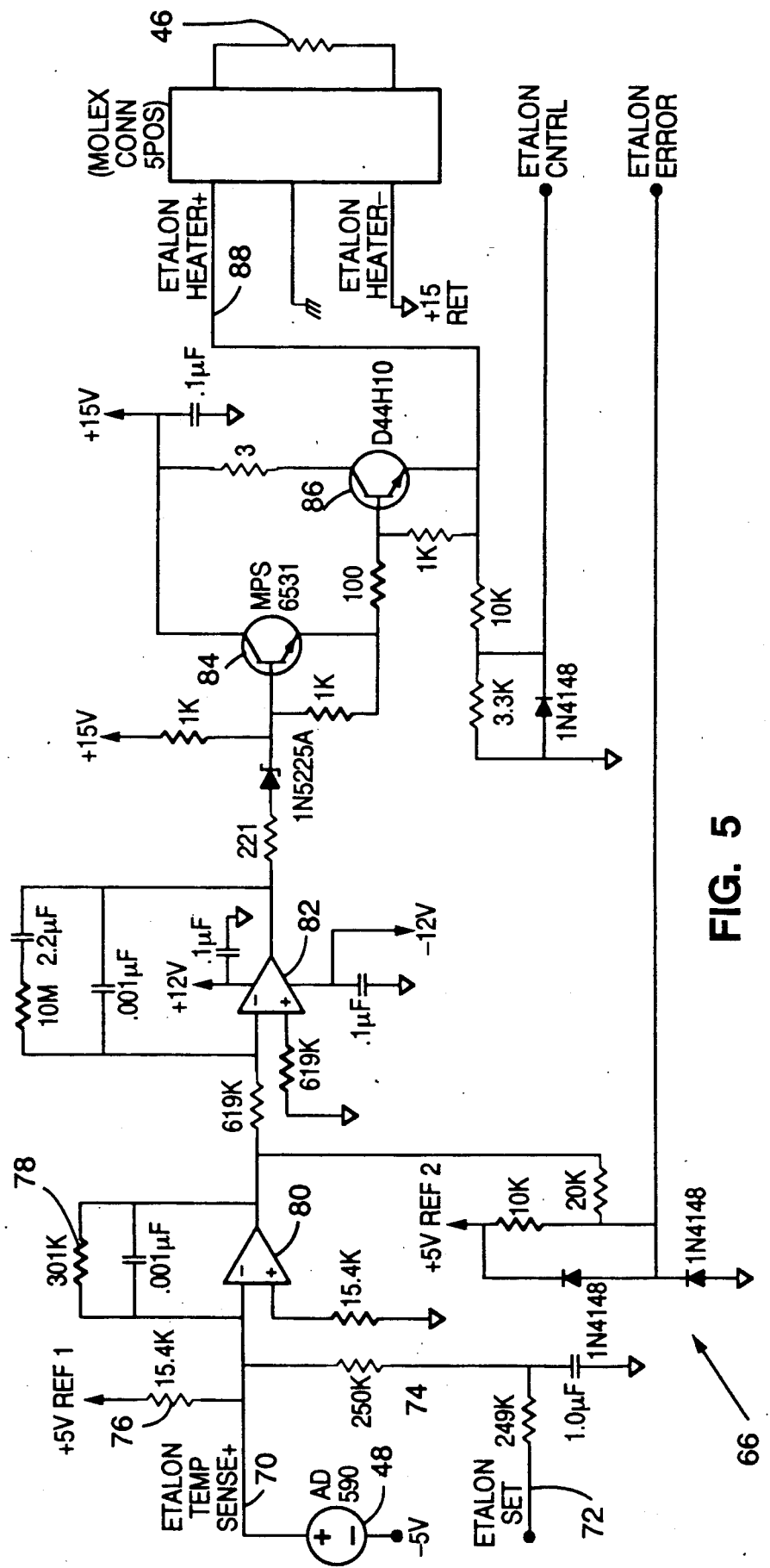
FIG. 5 is a schematic diagram of the temperature control circuit for the etalon.

FIG. 5 illustrates the temperature control circuit 66. Line 70 receives an input from the transducer 48 affixed in the oven 34. The transducer conducts one microamp per degree Kelvin. A five volt reference across a resistor is also supplied to line 70 to bias the circuit to 51.5° C. which is above the maximum ambient air temperature. Line 72 receives the voltage signal from D/A converter 64.

The zero to 5 volts to line 72 drives a current through resistor 74 of zero to 4 microamps. The five volt reference drives a current through resistor 76 of 324.6 microamps (51.5+273.1). The sum of these two currents minus the current conducted by the transducer 48 is conducted through resister 78. This generates an error signal voltage at the output of the amplifier 80 that is proportional to the difference between the temperature set by the signal from the D/A converter 64 and the temperature measured by the transducer 48.

Amplifier 82 drives a pair of transistors 84, 86 that supply voltage to the heater resistors 46 in the oven. The voltage supplied is proportional to the error signal input to amplifier 82 and acts to reduce the error signal by heating the oven or allowing the oven to cool. Amplifier 82 is compensated to match the thermal time constant of the oven design (FIGS. 3 and 4) to provide a stable control loop design. This control loop maintains the error signal at zero volts to stabilize the oven temperature to the temperature requested by the processor 62 to within 0.004° C.

Prior to discussing the etalon tracking program, the alternate preferred embodiment will be reviewed. In the laser systems offered by Coherent, Inc., the customer has choice of two primary modes of operation, namely, current regulation or light regulation. In the current regulation mode, the current to the laser is fixed and the laser output power is allowed to vary. One reason the power varies is due to the changes in alignment of the frequency of the selected longitudinal mode with the peak of the transmission curve of the etalon caused by a length change in the resonator. Thus, in the current regulation mode, the variations in the output power can be monitored to maintain optimal alignment conditions.

In contrast, in the light regulation mode, the control system is constrained to maintain a selected power. To achieve this goal, the current to the plasma tube must be varied. Since the control electronics are set to maintain a given power level, this latter parameter cannot be used to monitor variations which are indicative of changes in the length of the resonator. However, the tube current will be varying to make up for power losses. Thus, when the laser is operated in the light regulation mode, the variations in current are monitored and used in a feedback loop to control the etalon temperature.

FIG. 2 shows that the input to the etalon tracking program will include both the laser power and tube current. As noted above, the hardware and software for tracking these parameters typically exists in more sophisticated laser systems so that the added costs needed to implement the subject invention are minimal. The parameter utilized by the tracking program will depend on the operating mode selected by the customer. As will be seen below with respect to FIG. 6, there are only minor differences in the tracking program for each of the operating modes.

Figure 6A:
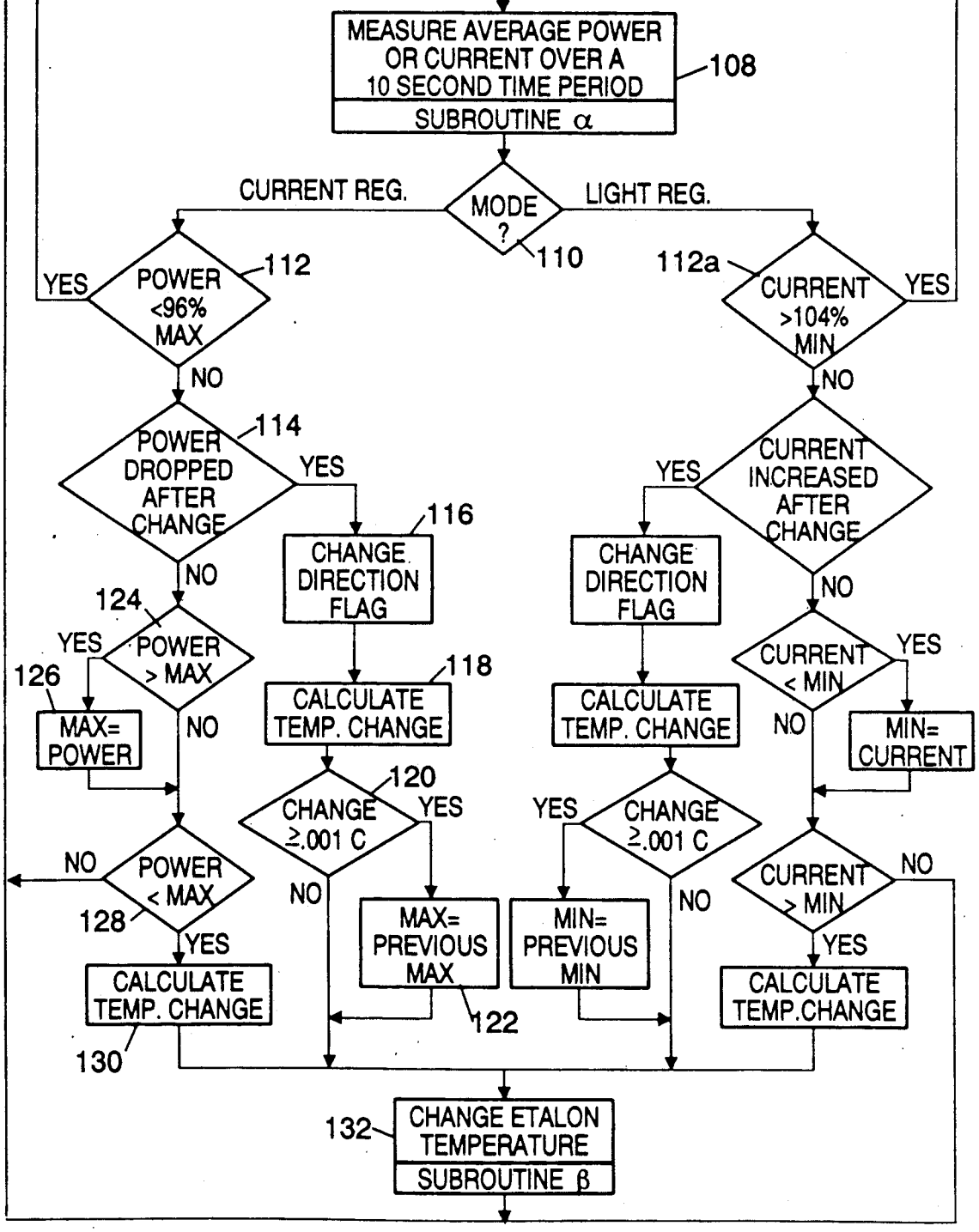
FIGS. 6a through 6c is a composite flow chart of the algorithm used by the processor to carry out the active adjustment of the temperature of the etalon in accordance with the subject invention.
Figure 6B:
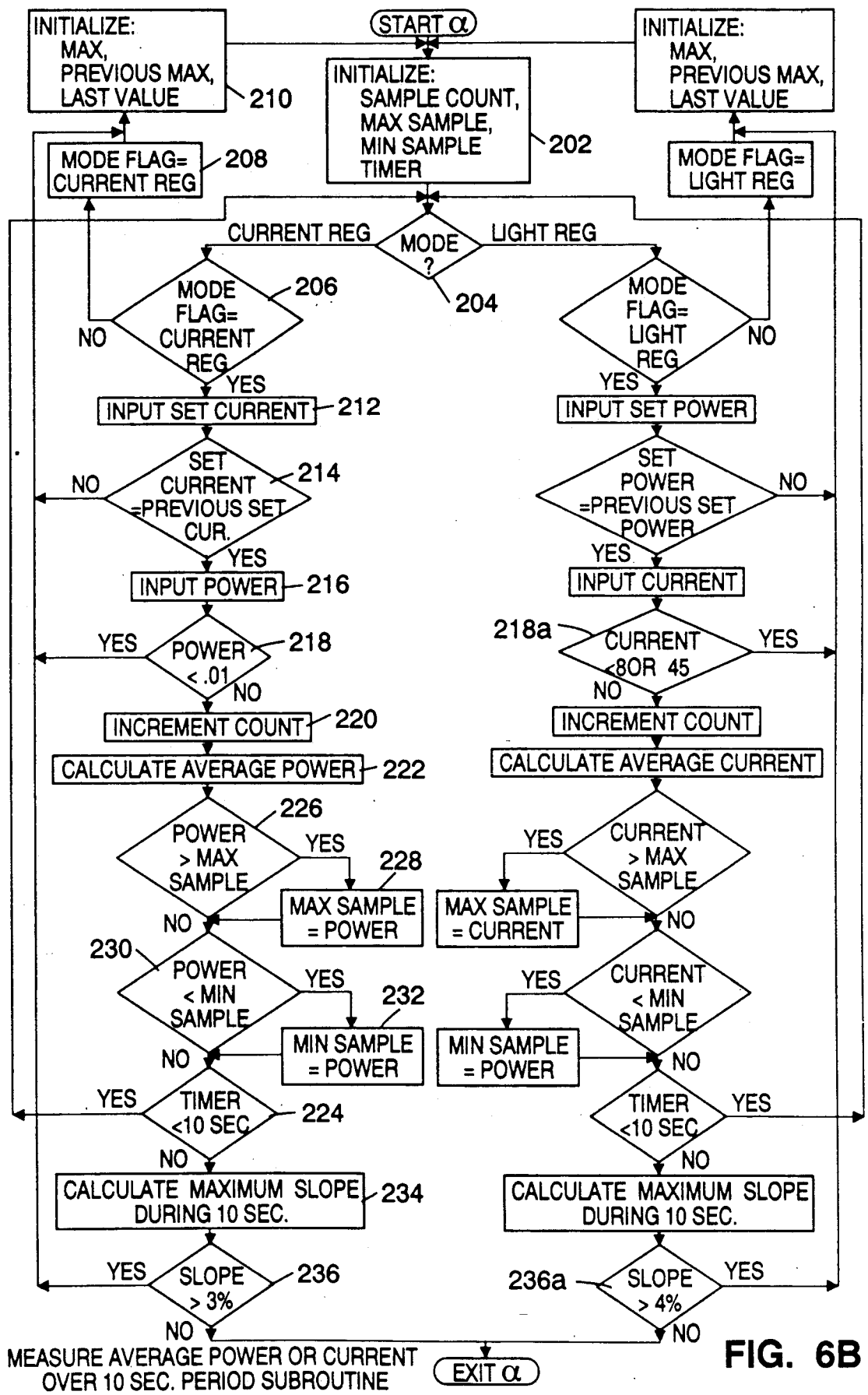
Figure 6C:
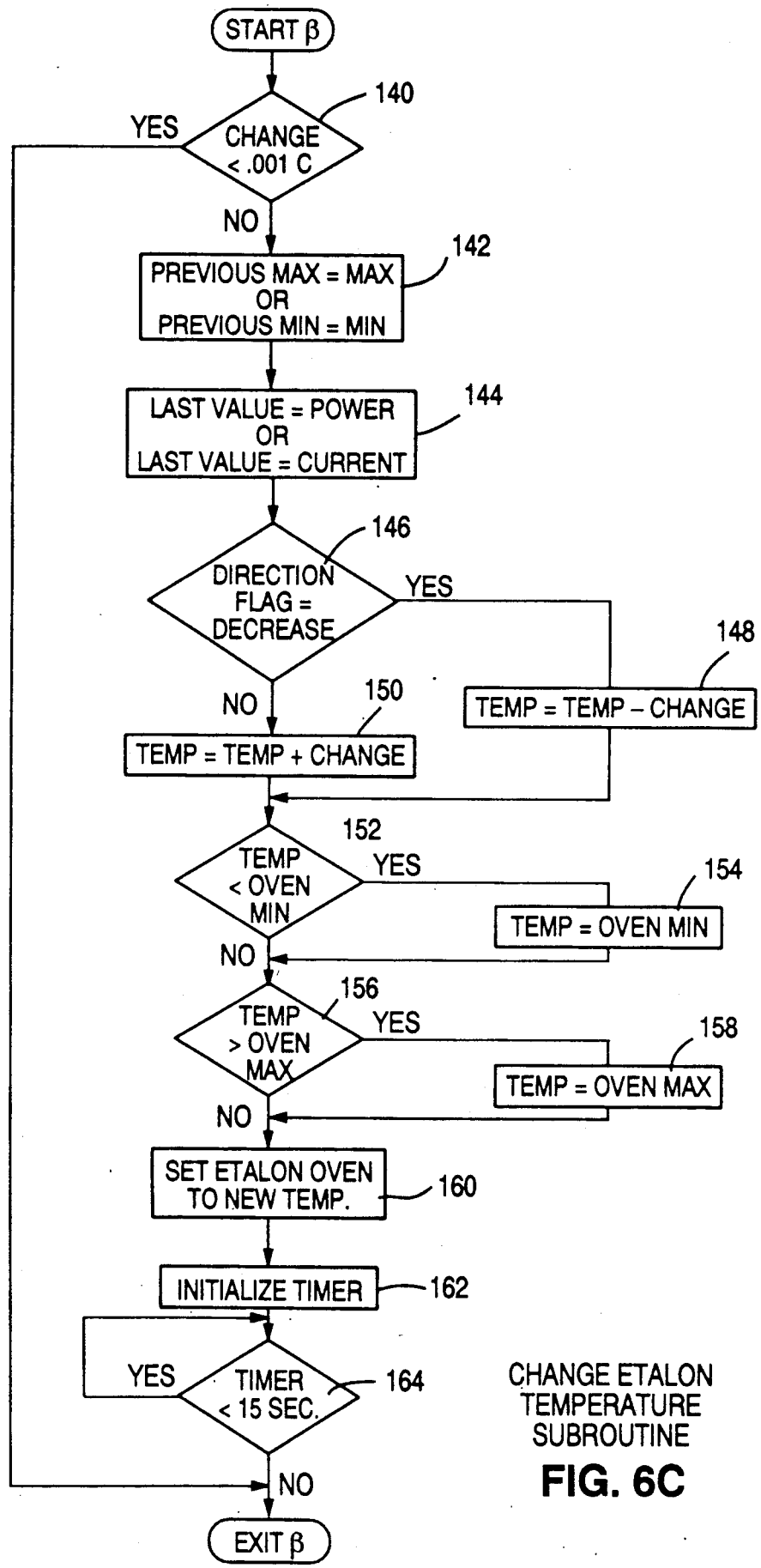

Turning now to FIGS. 6a to 6c, there is illustrated a flow chart of the etalon tracking program of the subject invention. At the start of the program, the temperature of the etalon is received from the CPU in step 102. The CPU knows what set temperature it is currently commanding of the etalon oven circuit. This temperature may initially be set manually by the user via a command from the laser remote control in a manner similar to the prior art method of setting and fixing the etalon temperature. Internal flags are then set in step 104.

One of the flags that is set relates to the direction of the next temperature change of the etalon. It should be appreciated that in operation, when a change in an operating parameter is detected, it will not be known whether the frequency of the selected mode is increasing or decreasing. Thus, the program cannot know in which direction the etalon temperature should be adjusted. As will be seen below, the program deals with this ambiguity by adjusting the temperature in a first, random direction, and then observing whether the monitored operating parameter improves or deteriorates. If the monitored parameter has improved, the program will assume that the adjustment was in the correct direction. If the monitored parameter has deteriorated, the program will assume that the direction of the temperature change must be reversed to compensate for the error.

During the initialization of the program, the flag which sets the direction of the next temperature adjustment is set to increase temperature of the etalon. The flag is set to increase temperature since during the warm up phase of the system (which can take several hours), it is almost certain that the etalon temperature will have to be increased because the length of the resonator will be increasing and the frequency of the selected mode will decrease.

In step 106, the parameters to be measured are set to zero. In step 108, the selected parameter is measured. In the preferred embodiment, in order to increase accuracy and smooth operation, this measurement actually consists of an average of a number of measurements taken over a ten second period. This averaging routine is set forth in subroutine α and will be discussed below with respect to FIG. 6b.

Once the selected measurement has been generated, the program will determine if any action needs to be taken. Assuming the laser is in the current regulation mode and power is being measured (step 110), the program will test to see if power has dropped more than four percent of a previously recorded maximum power level (step 112). If so, this spread will be considered too large to be handled by a small adjustment in the etalon temperature. Such a large drift will often occur during the very early stages of laser warm up or when other large perturbations occur.

Assuming the power has dropped from an operating maximum, but the amount of that drop is less than four percent, the program will determine if the temperature direction flag is properly set. In step 114, the program first determines if the measured power has dropped since the last measurement, provided the last measurement resulted in a command to adjust the etalon temperature. If so, the program will assume that the last command to change the etalon temperature shifted the temperature of the etalon in the wrong direction to correct the problem. In that case, the temperature direction flag is changed in step 116 and a new temperature change is calculated in step 118. The formula for calculating the temperature change if the previous change is incorrect is as follows:

$$Temp.\ change = (1 - power/last\ max.\ power) \times (gain)$$

where the gain is frequency dependent and inversely proportional to the tuning per degree C figure of the etalon at the operating wavelength.

If the calculated change is less than 0.001° C., then no actual change is possible and the parameters will not be adjusted (step 120). If the calculated change is greater than 0.001° C., then the internal variable maximum power will be set to be equal to the previous maximum power (step 122). This step will function to cancel step 142 of subroutine β (discussed below) which had previously changed the etalon temperature in the wrong direction.

If the present measurement has not just been taken immediately after a change in etalon temperature, (ie. the answer to step 114 is no), then the measured power must be compared with the recorded maximum power in step 124. If the measured power is greater, then a new maximum power is recorded (step 126) and the answer to step 128 (Is measured power less than the maximum power?) will always be "no" and the etalon temperature will not need be changed. Thus, if the resonator length is stable and the output power is constant or increasing, no adjustments or modulation will take place. If however, the measured power is lower than the recorded maximum (a "no" answer to step 124 and a "yes" answer to step 128), then the program will calculate an etalon temperature change (step 130). Since this branch of the program assumes that the temperature change is being made in the correct direction, the following formula can be used to calculate the change:

$$Temp.\ change = (1 - power/max.\ power) \times (gain)$$

At this point, the two branches of the program discussed so far rejoin, and the command to change the etalon temperature must be generated in step 132. This process is set forth in greater detail in subroutine β illustrated in FIG. 6c. More particularly, in step 140, a determination is made if the calculated change is greater than 0.001° C. and if it is not, no command will be generated. If the calculated change is greater than 0.001° C., then the previous maximum value is set to the current maximum power in step 142 and the last value is set to power in step 144. The last value is the power before the etalon temperature is changed and is used in step 114 to determine if the change to the etalon temperature caused a power drop which would indicate that the change was in the wrong direction. If the previous change was in the wrong direction, the previous maximum will be used in step 118 to calculate the corrected change so that the maximum used in step 118 is the same that was used previously in step 130.

In step 146, the program determines in which direction the direction flag has been set and derives a new etalon temperature based on the calculated change previously generated in either step 118 or 130 (either step 148 or 150). If the new derived temperature is above or below the maximums or minimums of the oven, the maximums or minimums are used (steps 152 to 158). In the preferred embodiment, the user will be signaled that the temperature has gone out of range. Assuming the derived temperature is within the operating range of the oven, the new temperature is set by sending a digital signal to the main processor 58 in step 160. As noted above, this signal is ultimately supplied as a voltage to the temperature control circuit 66.

Once the signal has been sent to change the oven temperature, the feedback cycle is suppressed so that the change can take place and its effect monitored. The cycle is suppressed by setting a 15 second timer in steps 162 and 164. With the low thermal mass and highly heat conductive oven, the effect of the temperature change should be observed after 15 seconds.

Once the etalon temperature change subroutine is complete, the active monitoring of the power can be restarted. The effect of the subject method is to insure that as the measured power drops, the peak of the transmission curve of the etalon is shifted to be aligned with the frequency of the selected mode. While this will allow some drift in frequency, it will prevent mode hopping wherein the output frequency abruptly shifts to another frequency.

Turning back to FIG. 6a, it will be seen that the blocks on the right hand side of the flow chart set forth the steps to be taken if the laser is being operated in the light regulation mode wherein power is held constant while the current is varied. These steps are exactly analogous to the current regulation mode and will not be discussed in detail.

The only differences arise from the fact that as the frequency of the selected mode drifts away from the peak of the transmission curve of the etalon, the current necessary to maintain the desired power will increase. Therefore, optimization is based on minimizing the current which indicates alignment of the selected mode with the peak of the transmission curve of the etalon. For example, and as seen in step 112a, if the current rise is less than four percent greater than the recorded minimum current, then the program will try to reset the etalon temperature to improve performance. The remaining steps (along with steps 142 and 144 on FIG. 6c) are modified in the same manner.

As noted above, the measurement of the selected parameter in step 108 consists of an averaging of multiple measurements. The measurement subroutine α is set forth in FIG. 6b.

At the start of this subroutine, the various counters are initialized to zero in step 202. Minimum sample is initialized to a value guaranteed to be larger than any sample measured and maximum sample is initialized to zero. These variables will keep track of the minimum and maximum of all the measurements during a sampling period defined by steps 226, 228, 230 and 232 discussed below.

The program then determines which operating mode has been selected by the user based on an input from the main processor (step 204) The program then makes sure the internal mode program flag is set to the same selection (ie. the user did not manually change the mode during the measurements), and if not, resets it and restarts the entire measurement process (steps 206, 208 and 210).

Assuming that the selected mode is current regulation, the program detects the present setting for the laser current (step 212). This information is received from the processor. If the present setting is different from the previous setting (ie. a manual change from the user), the program values must be reset again (steps 212 and 214)

Once all the values have been updated and set, the first laser power reading is taken in step 216. If the power is less than 0.01 watts, then it can assumed that the laser is not operating and the routine is repeated (step 218). If the laser power is greater than 0.01 watts, then the sample counter is incremented (step 220) and the average power is calculated (step 222).

The average power is calculated by taking the last calculated average power, multiplying that value by the number of samples that went into making that average (N−1), then adding the latest measurement and dividing by the present number of samples given by the counter (N). These sampling and averaging steps are repeated continuously for 10 seconds (step 224) during which time it is expected that roughly fifteen to twenty measurements will be taken. The calculated average power is then used as the output of step 108 in FIG. 6a.

Prior to leaving this subroutine, an additional test is performed to make sure there were no deviant measurements taken which could improperly weight the average or that the spread of measurements is too large to track with small adjustments of the etalon temperature. More specifically, during the sampling steps, the routine keeps track of both the maximum and minimum measured power levels (steps 226, 228, 230 and 232). The deviation between these two extremes over time (ie. the slope) is calculated in step 234. If this slope is greater than three percent, the entire sample is discarded and the measurements are begun again (step 236) If the slope is less than three percent, then the average power calculated in step 222 can be used.

As with FIG. 6a, the blocks on the right hand side of the flow chart of FIG. 6b illustrate the steps that occur when the laser is set in the light regulation mode. In this mode, the variation in the amperes being supplied to the plasma tube (which forces the laser to operate at a fixed output power), is monitored. The steps are the same as in the current regulation mode except that different thresholds are necessary. For example, in step 218a, the current measurement will only be considered valid if it is between 8 and 45 amps (the minimum and maximum for the illustrated laser). The only other difference occurs in step 236a wherein a slope of up to four percent is tolerated.

As can be appreciated, the subject method provides for continuous, rapid analysis of changes in either the power or current of the laser. These changes will be indicative of a change in the length of the resonator which causes a shift in the frequency of the selected mode. This frequency shift will displace the selected output from the peak of the transmission curve of the etalon. The subject method tracks this misalignment and actively changes the temperature of the etalon to bring the selected longitudinal mode back into alignment with the peak of the transmission curve of the etalon. In this way, the performance of the laser can be maximized. More importantly, mode hopping, which occurs when the peak of the transmission curve of the etalon favors a neighboring and different longitudinal mode is substantially reduced.

It has been found that in a laser operated in accordance with the subject invention, mode hops can be eliminated sometime within the first hour of operation (when frequency drift is quite large, on the order of 1.2 GHz) and continuously thereafter through environmental changes as large as 2°–3° C. per hour. In addition, when the laser is operated in the light regulation mode, higher starting currents and higher powers can be used since this approach tends to maximize performance.

While the subject invention has been described with reference to the preferred embodiments, other changes and modifications could be made therein by one skilled in the art without varying from the scope and spirit of the subject invention as defined by the appended claims.

I claim:

1. A method of operating a laser, said laser having a resonator with a temperature tunable etalon mounted therein for single frequency operation comprising the steps of:
   monitoring an output parameter of the laser that is indicative of variations in the alignment of the peak of the transmission frequency curve of the etalon with the frequency of the selected longitudinal mode of the laser, said variations arising from the drift in the frequency of the selected longitudinal mode caused by changes in the length of the resonator; and
   varying the temperature of the etalon based on the monitored output parameter so that the peak of the transmission frequency curve of the etalon tracks the mode in the laser.

2. A method as recited in claim 1 further including the step of:
   evaluating whether the monitored output parameter improved immediately after the temperature of the etalon was adjusted to determine if the temperature adjustment was in the correct direction.

3. A method as recited in claim 1 wherein in said adjusting step, the temperature of the etalon is initially set to increase during the warm-up stages of operation of the laser.

4. A method as recited in claim 1 wherein during said monitoring step, said output parameter is measured a number of times in a given period and wherein said measurements are averaged to provide a more accurate indication of the variation in the alignment of the peak of the transmission frequency curve of the etalon and the frequency of the selected longitudinal output mode of the laser.

5. A method as recited in claim 1 wherein the monitored output parameter is power.

6. A method as recited in claim 1 wherein the monitored output parameter is current.

7. A laser having a resonator comprising:
   an etalon mounted in said resonator for single frequency operation;
   oven means for varying the temperature of the etalon in order to vary the peak of its transmission frequency curve;
   detector means for measuring variations in the power of the laser; and
   processor means for controlling the oven means based upon the measured variations in power so that the peak of the transmission curve of the etalon tracks the drift in frequency of the laser to maximize the power output of the laser.

8. A laser as recited in claim 7 wherein said laser is an ion laser and said resonator length is passively stabilized.

9. A laser having a resonator comprising:
an etalon mounted in said resonator for single frequency operation;
oven means for varying the temperature of the etalon in order to vary the peak of its transmission frequency curve;
light regulation means for varying the laser current to maintain a fixed output power;
detector means for measuring variations in the current of the laser; and
processor means for controlling the oven means based upon the measured variations in current to maximize the power output of the laser.

10. A laser as recited in claim 9 wherein said processor means functions to adjust the temperature of the etalon so that the frequency of the transmission peak of the etalon tracks the drift in the frequency of the selected longitudinal mode of the laser.

11. A laser as recited in claim 9 wherein said laser is an ion laser and said resonator length is passively stabilized.

12. A laser having a resonator comprising:
an etalon mounted in said resonator for single frequency operation;
means for varying the temperature of the etalon in order to vary the peak of its transmission frequency curve;
detector means for measuring an output parameter of the laser that is indicative of the variations in the alignment of the peak of the transmission frequency curve of the etalon and the frequency of the selected longitudinal output mode of the laser, said variations arising from the drift in the frequency of the selected longitudinal mode caused by changes in the length of the resonator; and
processor means for controlling the temperature varying means based upon the detected variations in said output parameter to vary the peak of the transmission curve of the etalon so that the frequency of said peak tracks the drift in frequency of the selected longitudinal mode in the laser.

13. A laser as recited in claim 12 wherein said means for varying the temperature of the etalon is defined by an oven.

14. A laser as recited in claim 12 wherein said detected output parameter is power.

15. A laser as recited in claim 12 wherein said detected output parameter is current.

16. A method of operating a laser having a resonator and an etalon for single frequency operation comprising the steps of:
monitoring the drift in the frequency of the output of the laser caused by changes in the length of the resonator; and
adjusting the temperature of the etalon so that the peak of the transmission frequency curve tracks the drift in the output frequency of the laser.

* * * * *